Dec. 4, 1962
T. J. GORE
3,066,411
HAIR SHAPING DEVICE
Filed July 8, 1960
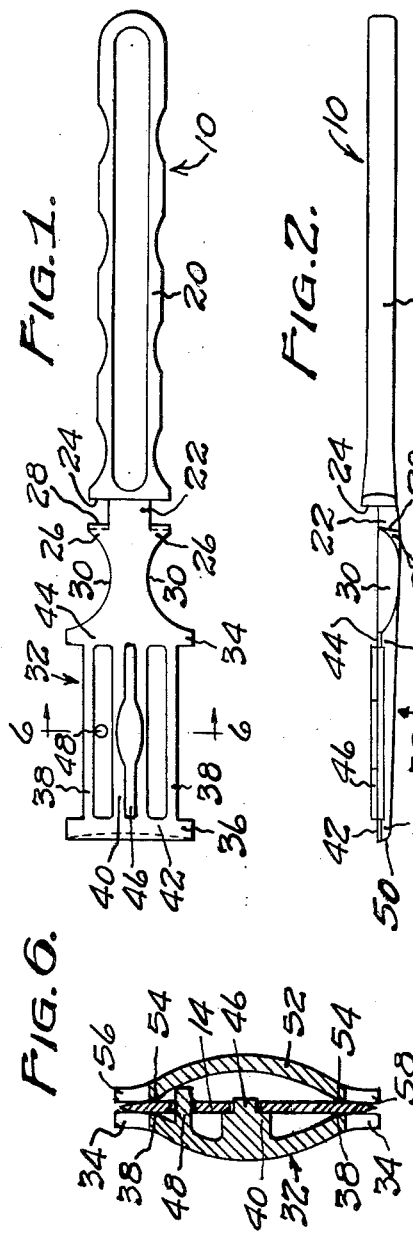
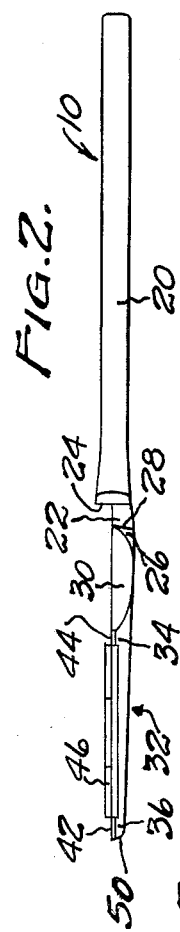
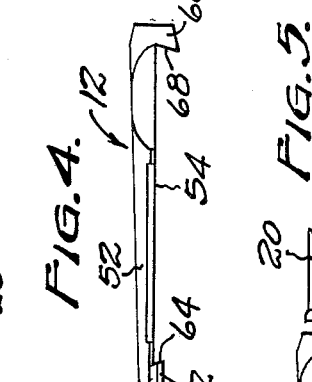
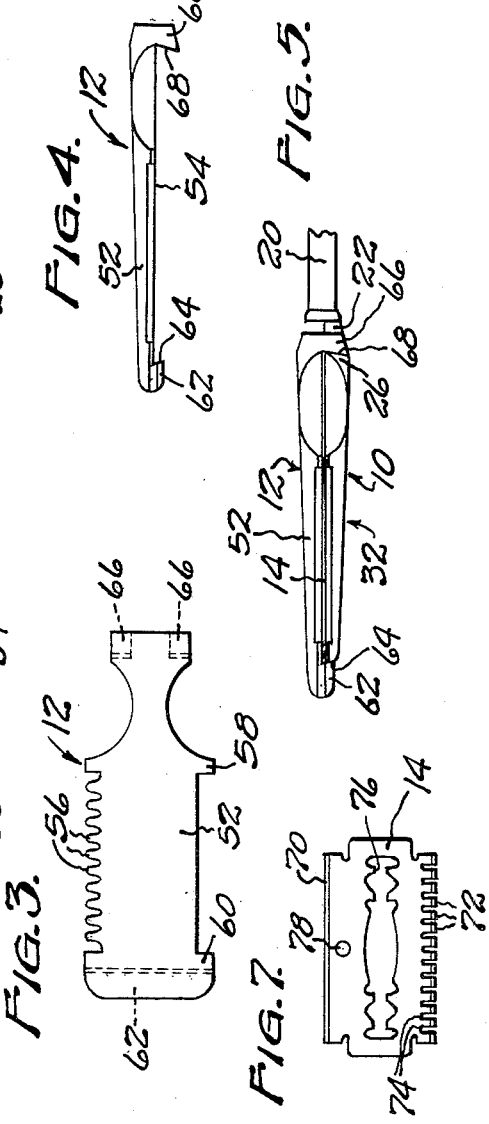
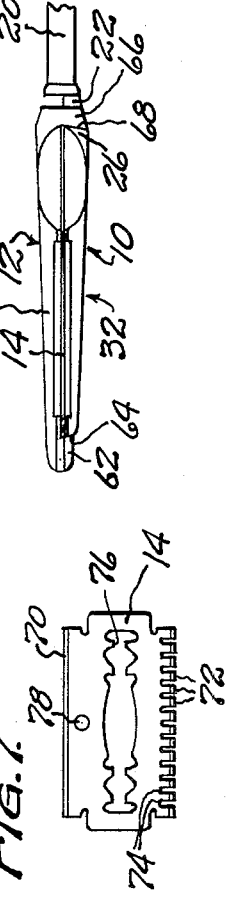
THOMAS J. GORE.
INVENTOR.
BY
Eugene C. Knoblock
ATTORNEY.

United States Patent Office 3,066,411
Patented Dec. 4, 1962

3,066,411
HAIR SHAPING DEVICE
Thomas J. Gore, Cassopolis, Mich.
(405 Lincoln Way W., South Bend, Ind.)
Filed July 8, 1960, Ser. No. 41,567
5 Claims. (Cl. 30—30)

This invention relates to improvements in hair shaping devices, and more particularly to a device of the type and capable of functioning in the manner disclosed in my Patent 2,814,112, dated November 26, 1957, entitled "Device for Tapering and Thinning Hair."

The primary object of this invention is to provide a device of this character which is simple in construction, which will mount a cutting blade firmly in a manner to accommodate its ready removal, which is light in weight, which is sturdy and inexpensive.

A further object is to provide a device of this character wherein a blade holder is provided which is formed of two parts molded from synthetic resin, and readily interlocked and released, so as to facilitate removal and replacement of a blade.

A further object is to provide a device of this character having parts which interlock in a manner to prevent undesired movement thereof relative to each other and relative to the blade carried thereby, and which can be disconnected by simply flexing the same to release the interlock therebetween but which will normally maintain a predetermined operative shape so as to maintain an interlocked relation of the parts thereof.

Other objects will be apparent from the following specification.

In the drawing:

FIG. 1 is a face view of one part of the device;

FIG. 2 is a side edge view of the part of the device shown in FIG. 1;

FIG. 3 is a face view of the other part of the device;

FIG. 4 is a side edge view of the part illustrated in FIG. 3;

FIG. 5 is a fragmentary side edge view of the device in assembled blade-carrying position;

FIG. 6 is an enlarged transverse sectional view taken on line 6—6 of FIG. 1, and illustrating the parts in assembled condition; and FIG. 7 is a face view of a blade used with the device.

Referring to the drawing which illustrates the preferred embodiment of the invention, the numeral 10 designates one part of the device; the numeral 12 designates a second part of the device; and the numeral 14 illustrates a cutting blade used in the device. Each of parts 10 and 12 is preferably formed from a synthetic resin material, such as nylon, so that it may be manufactured by molding thereof so that it does not require machining or shaping. The blade 14 will be formed of metal in the manner well understood in the art.

The part 10 has an elongated handle portion 20 of any suitable shape and contour. A neck portion 22 projects from one end of the handle. The neck 22 is of reduced width and reduced thickness and, as here shown, is of a thickness approximately one-half the thickness of the end of the handle from which it projects and has one face thereof located substantially in the longitudinal central plane of the handle 20, as illustrated in FIG. 2, so as to provide a shoulder 24 between the neck 22 and the handle from which it projects. A head portion projects from the neck and is preferably configured. Thus a pair of wing portions 26 project laterally from the neck, the same having shoulder-defining portions or surfaces 28 confronting the shoulder 24 and extending at a slight angle to the plane of the shoulder 24, such as an angle of 12 to 20 degrees or more. The side edges 30 of the head forwardly of the wings 26 are preferably curved to define the rear portion of a blade-engaging portion 32.

The portion 32 has spaced lateral projections 34 and 36 at its ends and a comparatively narrow intermediate portion between projections 34 and 36 and characterized by a substantially arcuate or curved cross-sectional configuration, as illustrated in FIG. 6. A pair of marginal flat narrow longitudinal surface portions 38 and a central flat longitudinal surface portion 40 preferably lie in a common plane in which preferably also lie the inner surfaces of the head portion at 42 and 44 and with the inner surface of the neck 22, and the portion of the head between the neck 22 and surface portion 44.

The surface 40 is provided by a central longitudinal stiffening rib as best seen in FIG. 6. A central longitudinally extending thickened blade-locating guide 46 projects from the face 40 of the reinforcing rib for purposes to be described. Part 10 is completed by an integral pin 48 projecting therefrom spaced from the reinforcing rib 40 substantially mid-length of the blade-engaging head portion. The end edge of the head is preferably straight, as seen in FIG. 2, and is undercut or beveled at 50, as seen in FIG. 2, at approximately the same angle from the coplanar surfaces 38, 40, 42 as the angular displacement of the wing edge faces 28 from the longitudinal inner plane of the neck 22 but in opposite direction, so that said angular faces 20 and 50 extend from the common plane defined by the inner surfaces of the neck 22 and of part 42 in a converging manner, as seen in FIG. 2.

Part 12 is complementary to the head portion of part 10 and includes a blade-engaging part 52 preferably of curved cross-sectional configuration, as seen in FIG. 6, so that narrow longitudinal marginal inner surface portions 54 thereof engage the blade opposite the blade-engaging surface portions 38 of part 10. A plurality of teeth 56 project laterally from part 52 at one longitudinal margin thereof. Lateral projections 58 and 60 of part 12 confront projections 34 and 36, respectively, of part 10. A transverse thickened lip portion 62 projects from the inner face of part 12 at one end and has an inner transverse edge 64 extending at an angle to the inner blade-engaging surfaces 54 similar to the angular relation between the faces 42 and 50 of part 10. Thus, as seen in FIG. 5, part 62 provides a hooked engagement between the parts 10 and 12 at the free outer ends thereof. At the opposite end of the member 12 are provided a pair of hook projections 66 spaced apart a distance slightly greater than the width of the neck 22 so as to straddle that neck and having inner surfaces 68 inclined to the blade-engaging surfaces 54 of the part 12 similarly to the inclination of the edges 28 of the wings 26 from the inner blade-engaging surfaces of the part 10. The hook projections 66 are of a longitudinal dimension less than the length of the neck 22 so as to be freely insertable between surfaces 24 and 28 of part 10.

It will be observed that the spacing between the hook projections 62 and 66 at the point of junction thereof with the main body portion 12 is substantially equal to the spacing along the plane 40, 42, 44 between the inclined edges 28 and 50 of the part 10. Also, the edges 64 and 68 extend away from the part 12 in converging relation so that their tips are spaced apart less than the spacing between the edges 28 and 50 at the blade-contacting surface of the part 10.

The blade 14 is preferably of the double-edge type. The width of the blade is greater than the width of the blade-engaging part 32 of the member 10. One edge portion 70 of the blade is straight and continuous, and the opposite edge portion 72 of the blade is notched at 74 throughout its length, said notches being of a depth to extend into the portion of the blade within the outline of the holder portions when the device is assembled. The blade has a central elongated preferably configured opening 76 therein of such shape and dimension as to fit snugly upon the locating guide 46 of the member 10 and also is preferably provided with an aperture 78 adapted to fit upon the pin 48 of the part 10.

In the assembly of the parts, blade 14 is mounted in proper position upon part 10, being located by the fit of locating guide 46 in blade opening 76 and by the fit of pin 48 in blade aperture 78. Thereupon, part 12 is superimposed upon the blade and the head end of part 10 by passing the hook projections 66 through the recesses at opposite sides of the neck 22 of the part 10, whereupon the projection 62 of the member 12 will bear upon the blade holder surface 42 or upon the end of the blade 14. Thereupon, the part 32 of the member 10 is flexed or bent in an upward direction at its tip, as viewed in FIG. 2. The flexure of the part 32 results in reduction of the spacing between the edges 28 and 50 sufficient to permit the free edge 50 to enter in the recess of part 12 to confront the inner edge 64 of the hook projection 62. Thereupon, flexing pressure upon the parts is released and the parts, by their inherent resilience, reassume the position shown in FIG. 5, namely, to normal substantially straight and unflexed contour. An interlock between the parts 10 and 12 is effected by virtue of face engagement of undercut shoulder faces 68 with undercut wing edges 28 and by face engagement between undercut surfaces 64 and 50.

The parts 10 and 12 are held together in their normal interlocked relation, as seen in FIG. 5, and firmly clamp and position the blade between marginal surfaces 38 and 54 with its opposite edged portions 70 and 72 exposed. Thus edge 70 will preferably be exposed between the teeth 56 of part 12 and the notched edge portion or teeth 72 of blade 14 will project beyond the plain recessed edge of part 52, seen at the bottom in FIG. 3 between projections 58 and 60. Lateral relative displacement of the part 12 relative to the part 10 is prevented by the close fit of the projections 66 at opposite sides of the neck 22 of the part 10 and by the elongated transverse dimension of the hooked undercut surfaces 50 and 64. These cooperating positioning parts, together with the interfit of the blade 14 with guides 46 and 48 of part 10, insure proper positioning of the blade relative to both of the carrier parts.

When it is desired to disengage the part 12 from the part 10, the device may be held by grasping the handle 20 with the portion 12 uppermost and preferably with the forefinger of the gripping hand pressed upon the part 12 adjacent the hook projections 66. The tool is then applied to a tabletop or other surface while longitudinally inclined, so that the hook 62 engages that tabletop or supporting surface. Pressure is then applied in a downward direction to flex the part 12 and the blade-engaging end 32 of the part 10 until sufficient flexure occurs to permit the hooked parts or surfaces 64 and 50 to disengage. Thereupon, the part 12 may be manipulated to release the projections 66 thereof from the spaces between the shoulders 24 and 28 of part 10, and the blade can be lifted from the blade-mounting portion 32 of the part 10 for cleaning or replacement.

Inasmuch as the parts 10 and 12 are formed of plastic material and preferably of nylon, they can be formed accurately and inexpensively by a molding operation and do not require any machining or finishing after being produced. Likewise, the toughness and wear resistance of the nylon insures that the parts will have a long life and will maintain their effective interlock despite repeated and long continued manipulation to engage and disengage the parts, as above described. Furthermore, the nylon has requisite resilience to avoid taking a set in curved form as a result of repeated flexing thereof.

While the preferred embodiment of the invention has been illustrated and described, it will be understood that changes in construction may be made within the scope of the appended claims without departing from the spirit of the invention.

I claim:
1. A hair shaping device comprising a flexible blade and a two-part blade carrier, one carrier part having a handle, a blade-engaging head and a reduced width neck between said head and handle, the other carrier part having hook projections at opposite ends thereof releasably interlocking with opposite ends of said head, the hook projections at one end being spaced to fit at opposite sides of said neck, said carrier being formed of shape-retaining resilient material, said carrier parts being curved transversely and having confronting blade-clamping margins, one of said carrier parts having central longitudinal blade-engaging reinforcement and a guide projection, said blade seating on said reinforcement and having an aperture fitting snugly around said guide projection.

2. A hair-shaping device comprising a flexible blade and a two-part blade carrier, one carrier part having a handle, a blade-engaging head and a reduced width neck between said head and handle, the other carrier part having hook projections at opposite ends thereof interlocking with opposite ends of said head, the hook projections at one end being spaced to fit at opposite sides of said neck, said carrier being formed of shape-retaining resilient material, the hook projections at opposite ends of said second named carrier part having inner faces lying in converging planes, the first named carrier part having hook-engaging surfaces complementary to said inner hook projection faces.

3. A hair shaping device comprising a flexible blade and a two-part blade carrier, one carrier part having a handle, a blade-engaging head and a shoulder portion at the free end of said head and at least one shoulder portion between said head and handle, the other carrier part having hook projections at opposite ends thereof releasably interlocking with said shoulders, one of said carrier parts having laterally spaced portions extending at opposite sides of a portion of the other carrier part adjacent the hook and shoulder interlock located between the handle and head of said first named carrier part, said carrier being formed of shape-retaining resilient material, the hook projections at opposite ends of said second named carrier part having inner faces lying in converging planes, the shoulders of said first named carrier part having surfaces substantially complementary to said inner faces of said hook projections.

4. A hair shaping device as defined in claim 3, wherein the hook projection at the free end of the head portion of said first carrier part and the shoulder interlocking therewith extend substantially full width of said head portion.

5. A hair shaping device as defined in claim 3, wherein said carrier parts have confronting blade-clamping marginal portions and one carrier part has a central blade-engaging reinforcement and a guide portion, said blade seating on said reinforcement and having an aperture fitting snugly around said guide projection.

References Cited in the file of this patent
UNITED STATES PATENTS

| 1,311,438 | Copus | July 29, 1919 |
| 2,814,112 | Gore | Nov. 26, 1957 |
| 2,972,187 | Gore | Dec. 23, 1957 |